Feb. 21, 1961   V. S. DE MARCHI ET AL   2,972,303
METHOD AND APPARATUS FOR PRINTING INK
Filed Nov. 28, 1955   3 Sheets-Sheet 1

INVENTORS.
Vincent S. de Marchi
Albert E. Gessler
William Van Kirk

Feb. 21, 1961  V. S. DE MARCHI ET AL  2,972,303
METHOD AND APPARATUS FOR PRINTING INK

Filed Nov. 28, 1955  3 Sheets-Sheet 3

INVENTORS.
Vincent S. de Marchi
Albert E. Gessler
William Van Kirk

United States Patent Office 2,972,303
Patented Feb. 21, 1961

2,972,303

METHOD AND APPARATUS FOR PRINTING INK

Vincent S. de Marchi, Jamaica, Albert E. Gessler, Scarsdale, and William Van Kirk, New Hyde Park, N.Y., assignors to Interchemical Corporation, New York, N.Y., a corporation of Ohio Filed Nov. 28, 1955, Ser. No. 549,349

4 Claims. (Cl. 101—426)

This invention relates to that segment of the printing industry which involves printing with relatively viscous inks on presses with extended distribution systems, i.e. letter press and lithographic printing. The principal aim of the present invention is to provide a method and apparatus permitting the use of inks which are unprintable under ordinary ambient conditions because they dry too rapidly, while permitting the pressmen ready access to the entire press. We obtain this result by producing a gas in whose atmosphere the ink is stable, and then forming a blanket of the gas about the distribution system, by feeding the gas into the advancing nips between the rollers of the distribution system to maintain a blanket of the gas on the rollers throughout the printing cycle.

Until the early 1930's, typographic or lithographic inks used for printing webs of paper were of two types. For printing of newsprint and similar absorbent stocks, mineral oil inks were used; they dried by absorption of vehicle into the paper. For super-calendered and coated papers which were less absorbent, inks made of oxidizing oil vehicles were used. Because of the slow drying of these inks, printing speeds were low and a traveling tympan was run with the paper to prevent offset and smearing.

The first improvement in these methods came with the advent of heat drying inks (see Gessler U.S. Patent 2,087,190). There inks are characteristically based on solutions of hard thermoplastic resins in petroleum derived solvents which, at usual ambient temperatures, have vapor pressures below 0.05 mm. of mercury, so that they evaporate very slowly on the press, but leave the printed films fairly rapidly when the printed paper is passed through one of the heaters with which these presses are equipped, and which bring the temperature of the web to about 300° F. to 450° F. These solvents are characteristically paraffinic in nature, with boiling ranges between 450° F. and 600° F., and with vapor pressures of the order of 0.05 to below 0.005 mm., at 95° F. (corresponding to the properties of normal paraffin hydrocarbons in the $C_{14}$ to $C_{18}$ range). These inks have found general use in the publication field, and are currently being printed at speeds up to 1500 feet per minute, and in four colors.

A second improvement which has found wide acceptance in the packaging field involves inks based on resins dissolved in glycols and/or polyglycols, the resins being insoluble in these solvents when they pick up water, either by being after-treated with water or steam, or merely by absorption from the air or paper. These inks dry by resin precipitation; the solvent-water mixture, free of resin, is absorbed by the printed stock, and eventually evaporates. This form of drying is substantially slower than that obtained with heat drying inks, but is a great improvement over old style drying oil inks.

In the field of moisture setting inks, considerable difficulty is encountered in printing during periods of high humidity. Under such conditions, the inks on the distribution system pick up sufficient moisture that resin precipitation and thus drying is brought about prematurely. To prevent this or to stabilize the ink on the distribution system the formulator has been required to decrease the moisture sensitivity of the ink which results in slower drying of the ink on the paper after printing. This stabilization is accomplished by the use of solvents of lower hygroscopicity or by the addition of stabilizing compounds.

In the field of heat drying inks, there has been considerable pressure for more rapid drying, so that the presses could be speeded up. This can be obtained by using more volatile solvents in the inks. However, such inks cannot be printed on presses with the extended distribution systems necessary for quality printing, because they dry on the distribution system under ordinary ambient conditions.

With heat drying inks the expedient of enclosing the distribution system of the press has been suggested by a number of workers based on experience in rotogravure systems, both to reduce solvent loss by evaporation and to prevent contamination of the atmosphere surrounding the printing press by the evaporating solvent. However, while the enclosed system has been highly successful in rotogravure printing, it has not proved satisfactory for conventional typographic or lithographic printing.

In such printing, the ink is picked up from a fountain by a roller, and is transferred to other rollers, alternately metal and rubber, to produce eventually on the plate an even film a few ten thousandths of an inch in thickness. Generally, between ten and twenty rollers are used. In each transfer of ink, the thin film is literally torn in two, part remaining on the original roller, part transferring to the next roller. The work done in splitting and smoothing out the film produces heat—temperatures up to 140° F. have been observed on uncooled presses, and temperatures of 90 to 100° F. can be observed on some presses even where the metal rollers are water cooled. During the splitting, the film is pulled into innumerable thin filaments of less than 1 mil diameter, and in this form is exposed, ten to twenty times, to the atmosphere around the distributing system, with a relative movement at press speeds equivalent to 15 to 20 miles per hour. This extreme exposure of the film has limited conventional typographic ink vehicles to very slowly evaporating solvents, even in closed systems.

In our copending application Serial No. 421,242, filed April 6, 1954, it was disclosed that it is possible to print on presses having extended distributing systems with solvent based inks which dry so much more rapidly than present day inks that even single impressions cannot be taken from an ordinary proof press. The method permits the use of supper fast inks whose vehicles comprise resin solutions in organic solvents with boiling ranges much below those of previous heat drying ink solvents, and, at ordinary ambient temperatures, whose vapor pressures and rates of evaporation may be 10 to 40 times that of the solvents in previous heat drying inks. The inks preferably employ petroleum derived solvents with boiling ranges between 350° and 425° F., corresponding to commercial paraffinic fractions whose principal constituents can be ideally represented as n-hendecane and n-dodecane.

These inks are not printable under ordinary ambient conditions on typographic presses. According to the invention disclosed in that application they are printable on such presses when the atmosphere surrounding the distributing system of the press contains a concentration of ink-solvent-vapor which is maintained in such relationship to the temperature of the ink film on the distributing system that the average ink film temperature does not exceed the dew point temperature of the solvent vapor of that atmosphere by more than a few degrees Fahrenheit, and preferably approximates that dew point temperature. It was pointed out that this relationship can be maintained by feeding into the vicinity of the press distributing system air or other gas, free of suspended droplets, and containing such a concentration of solvent vapor that there is a tendency toward condensation on the distributing system rather than evaporation from the ink film. As disclosed in that application, the distributing system was enclosed to conserve the atmosphere. It was necessary that care be taken to prevent mist accumulation in the enclosure, so that the body of air saturated with solvent vapor, be kept below the explosive limit.

In working with this system, we discovered that it is not essential to maintain a large body of saturated atmosphere about the distribution system of a press to keep a fast drying ink from setting on the rollers, but that such setting can be prevented by maintaining around the rollers a thin blanket of gas which is sufficiently laden with ink-solvent vapor to retard evaporation of solvent by the ink. We have discovered further that such a blanket can be maintained by feeding directly into the available advancing nips of the distributing roller couples, a gas containing the necessary amount of ink-solvent vapor.

In typical distribution systems, sufficient of the gas blanket is carried along the rollers so that in roller clusters, where only a small amount of the total surface is exposed to the free air, all of the nips need not be blanketed.

The method and apparatus are useful not only with heat drying inks, but can be used with moisture drying inks as well to provide the body of air of low humidity about the distributing system of the press, called for by the copending Bernardi application Serial No. 549,203, filed November 25, 1955. This low humidity air, like the solvent-laden gas for heat drying inks, represents an atmosphere in which the ink is stable, as compared with ordinary ambient conditions.

When the preformed gas is fed into the advancing nips between a pair of rollers, it performs a number of functions. In the first place, it blankets the nip, in which the ink is being divided, preventing outside air from being drawn into the nip and evaporating solvent from the ink films as rupture occurs. Furthermore, we have discovered that the gas is then drawn out as a closely adhering layer or blanket on the rollers, accompanying and blanketing the ink film underneath it, effectively preventing either evaporation during passage of the ink to the next nip or precipitation of ink by water vapor in the ambient atmosphere. Here the gas blanket or film is stripped from the ink film and backs away; the ink going out into the advancing nips picks up a fresh gas film.

The invention can be understood by reference to the accompanying drawings, in which Fig. 1 is a schematic representation of a four color press equipped for the practice of our invention, with a device for saturating air with ink solvent vapor;

Figure 1:
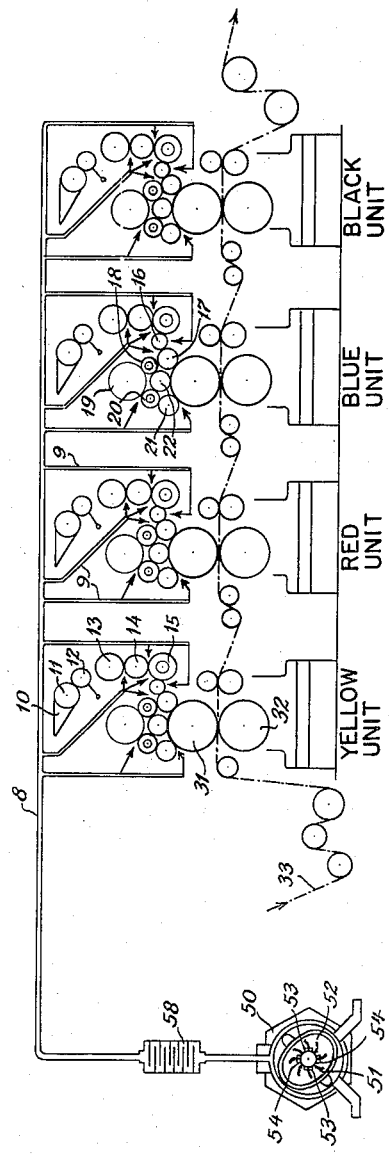

Referring to Fig. 1, a press having four separate color units, identified in the drawing by the color which is ordinarily printed by the unit, may be used for the practice of the invention. Each unit consists of a printing cylinder 31 having a printing plate mounted on it, and an impression cylinder 32. A web 33 of paper is fed through the press by appropriate rollers; passing from an unwind, through the four printing units, out to a dryer of an appropriate design, and then to another similar press to print the other side, or to a rewind, sheeter or folder.

The printing plates are inked by a distribution system which carries the ink down to the plate from fountain 10. A fountain roller 11, of metal rotates with an intermittent jerky movement, to present a series of freshly inked spots to the ductor roller 12. This roller is alternately pressed against the fountain roller 11 and moves with it to pick up a dab of ink, and against the roller 13 to deliver ink to that roller. The ink films on 11 and 12 are thick, and neither roller rotates rapidly, so there is no serious problem of evaporation on these rollers.

Distribution of the ink, and reducing of the film down to printing thinness of under .001 inch, comes on the remaining rollers. At the advancing nip between the metal roller 13 and the rubber-covered roller 14, we place the first source of gas 1.

Figure 3:
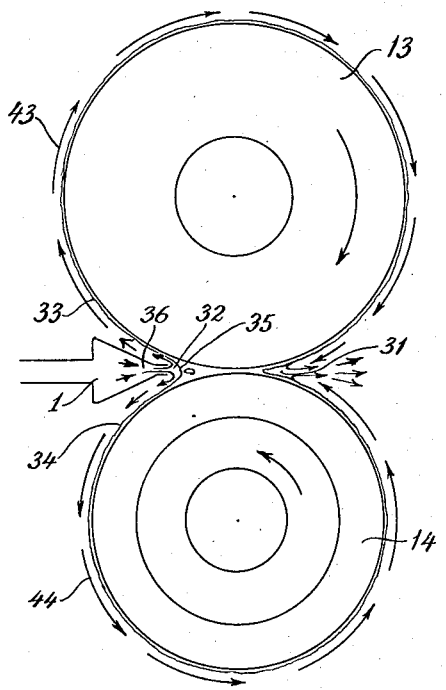
Fig. 3 is a close up view of a single nip, with ink flow and gas flow indicated.

Referring to Fig. 3, the roller 13 carries an ink film 33 into the nip 31 between it and the roller 14. At the emerging end 32 of the nip, this ink film distributes between the rollers 13 and 14, being first strung out into strings 35 (here exaggerated) which split to reform the film 33 and an ink film 34 on roller 14.

The source of gas 1 is a hollow triangular pipe fitted close to the nip, with an opening 36, feeding gas directly to the nip. This gas blankets the nip, providing the splitting film with an adhering blanket which keeps ambient air out of the nip. This gas cushion is drawn along the rollers 13 and 14 to form gas blankets 43 and 44, overlaying and protecting the films 33 and 34, and preventing evaporation or precipitation.

Figure 2:
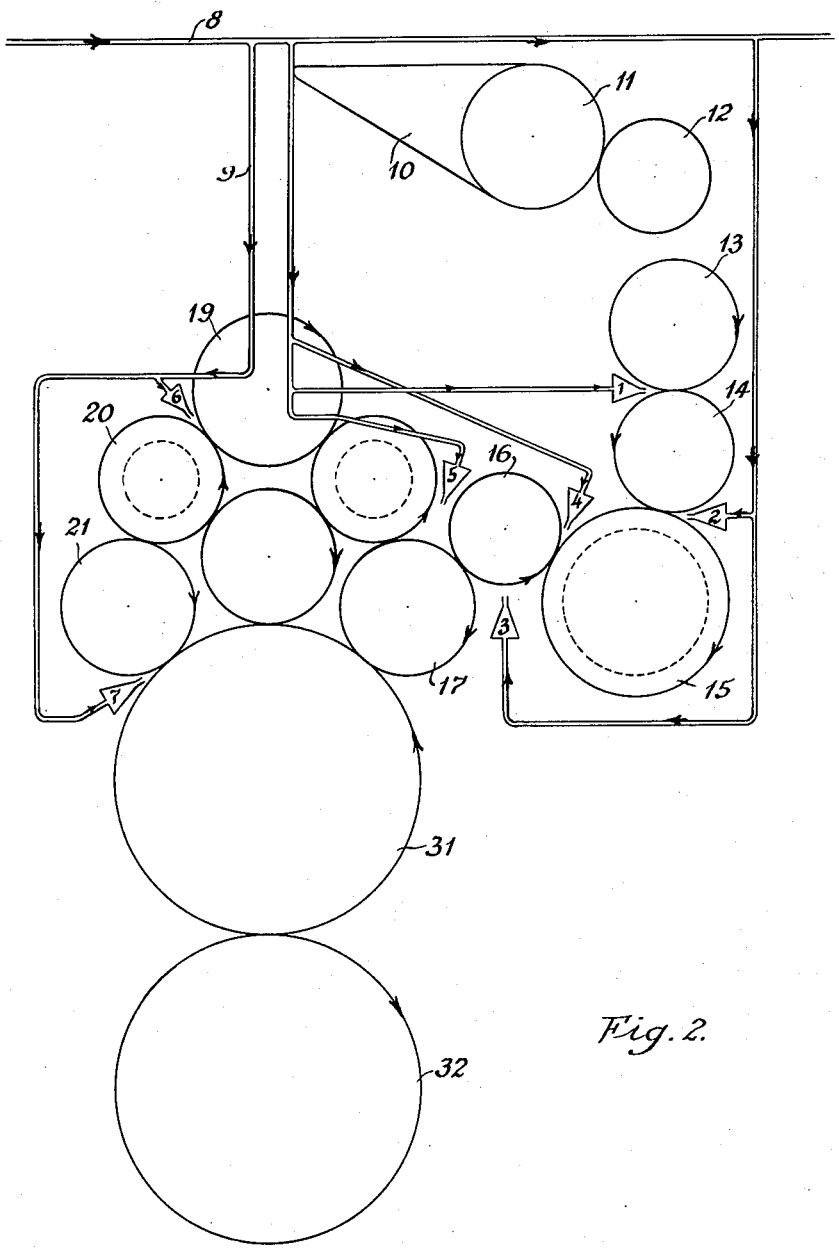
Fig. 2 is a schematic diagram of the distribution system of a single unit.

Referring now to Fig. 2, similar action is obtained with diffusion outlet 2, between the roller 14 and the cooled metal roller 15. It is possible at this point to vary the temperature of the ink film, by control of the cooling water, to vary the saturation of the gas blanket with respect to heat-drying ink; since the vapor pressure of the solvent of the ink depends on the ink temeprature, it will evaporate solvent into the gas blanket, or condense solvent from it, depending on the relationship of ink vapor pressure to solvent vapor pressure in the gas. This permits a pressman to adjust ink body, by controls at this point, and on the two later water cooled rollers in the system.

Diffuser 4 controls the nip between metal roller 15 and rubber roller 14. From this point on, most of the remaining nips are inaccessible and partially enclosed by rollers etc., so it is necessary to improvise. Roller 16 meets the first rubber roller 17, which inks the plate 31, but passes most of its ink to cooled metal roller 18. This in turn inks rubber roller 19, and the second form roller 22; roller 19 inks roller 20, which inks both the form rollers 21 and 22. The only open advancing nip is the 19–20 nip; diffuser 6 feeds gas into this port.

Diffusers 3 and 5 are placed at a distance from their respective nips only because of mechanical considerations. The small clearance between rollers 16 and 18 prevents the diffuser 5 from being pushed into the nip; in the case of diffuser 3, a frame bracket (not shown) prevents closer contact. However, in such restricted spaces blanketing is obtained even under these conditions.

Because of the clustering of the rollers beyond roller 16 in the system, the air space surrounded by the cluster becomes sufficiently full of ink-solvent vapor so that no trouble is encountered with evaporation in this space. Actually, we have obtained good results without diffusers 3 and 4; in the relatively enclosed space, the air blanket forced off the rollers 14 and 15 with gas from port 5 provide a source of gas sufficient to protect these rollers during normal press operations.

The gas which is fed into the diffusers is obtained from a line 9, which feeds down into each unit from a manifold 8. This manifold in turn is connected with a source of gas.

In the case of heat-drying inks, we provide, as shown in Fig. 1, a saturator 50, which may comprise a liquid sealed compressor consisting of a vaned rotor 51, operating in a liquid seal 52 of ink solvent. To pass from the inlet ports 53 to the outlet ports 54 of the saturator, air feeding into the compressor must pass through the liquid solvent, and thus becomes substantially saturated with solvent vapor at the temperature and pressure in the compressor chamber. We preferably employ a baffled trap 58 in the line from the saturator to the manifold 8 to prevent liquid from being entrained in the gas. Complete elimination of mist is not essential, although desirable.

Figure 4:
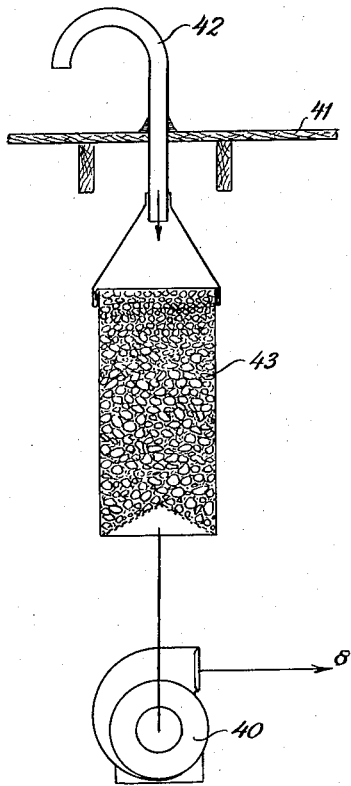
Fig. 4 is a schematic diagram of an air drying unit useful for making dry air for the practice of our invention.

With moisture drying inks, we provide dehumidified air, as shown in Fig. 4, with a blower 40 which feeds into the manifold 8. It draws air, preferably from above the roof 41 through a pipe 42 and a drier bed 43. This may be, for example, a bed five feet deep of mixed briquettes and flakes of anhydrous calcium chloride; such a simple device will produce air of 25 to 30% relative humidity.

The amount of gas fed about the distribution system should be sufficient to maintain a film of about one thousandth of an inch or more about the rollers. The actual quantity used depends on the size and speed of the distribution system, the temperature of the gas and the manner in which the rollers are distributed. Excess gas can be used, and exhausted as it builds up—but in general, we prefer to avoid any substantial excess because of extra cost.

In operating the illustrated press, with rollers which are about 12 to 15 inches wide and from 2½ to 4½ inches in diameter, we have obtained adequate control, at speeds of 800 feet per minute, with a flow of 10 cubic feet of gas per minute for each unit (about 1.41 cubic feet per diffuser per minute), using inks with solvents having 365 to 425° F. boiling range, and gas approximately saturated with the ink solvent at ink film temperatures. Under such conditions, the blanket of ink about the rollers is about .001 to .006 inch thick.

With moisture setting inks on the same press, using similar flow rates of air dried to 25 to 30% relative humidity, we have been able to print inks which are unstable at ambient relative humidities above 50%, on days in which the relative humidity in the press room was up to 85%.

Our method has several very distinct advantages over any method utilizing a large body of special atmosphere about a press. An important advantage is that of convenience—the pressman can work about the press as freely as if no special atmosphere were used.

A second important advantage in the case of heat-setting inks is safety—there is no body of solvent laden air in which ink mist and vapor-droplets can possibly accumulate because the solvent over the distribution system is diluted immediately by the surrounding air, so that the explosion hazard, with solvents whose flash-points are above ordinary press temperatures, is eliminated. While it is desirable that the gas be relatively free of solvent droplets, to minimize condensation and expense, it is not essential because of explosion hazard.

Another advantage with both heat setting and moisture setting inks, is that there is no necessity for delay in starting up, nor any real necessity for maintaining the solvent blanket during a shut down. The flooding of the rollers is extremely rapid. With heat set inks, if flow is started just before the fountain roller is engaged, and the ink on the distribution system softened either by spraying or by condensation of solvent on the cold rollers from the gas fed into the nips, printing can be commenced in less than a minute. This compares with a definite period of some minutes required to fill an enclosure with gas. And the blanket of gas can be maintained during shut downs, simply by idling the distribution system. Even if the distribution system is stopped, the blanket does not dissipate immediately; protection is maintained for about 2 to 5 minutes, depending on ambient temperature, air movement, etc.

Finally, there is a cost advantage. Not only is the original cost of our installation far less than that of one which maintains a body of gas around the distributing system, but also it requires less gas during operation. Runs on an installation similar to that of Fig. 2, as compared with an identical press completely enclosed, gave a one-third saving in gas for our new process.

The range of heat set inks suitable for use according to the present invention is largely a matter of economics and safety. It is undesirable to use inks which require too high a vapor concentration in the gas blanket over the rollers, and it is unsafe to use solvents which are toxic, or which flash below press temperatures. Consequently, we prefer to use inks based on resins dissolved in commercial paraffinic fractions whose principal constituents range can be represented as n-nonane to n-hendecane, and whose boiling ranges lie between about 300 and 425° F., for use with solvent saturated air.

Illustrative of the heat drying inks which may be used are the following:

EXAMPLE 1.—SET OF PROCESS INKS

*A.—Yellow ink*

| | |
|---|---|
| Benzidine yellow | 15.50 |
| Pentalyn G (pentaerythritol ester of polymerized rosin) | 46.10 |
| Aluminum stearate | 0.48 |
| Oleic acid | 2.86 |
| Paraffinic petroleum solvent—principally hendecanes and dodecanes, boiling range 365 to 400° F., Kauri butanol value 32 | 35.06 |
| | 100.00 |

*B.—Red ink*

| | |
|---|---|
| Eosine red | 17.00 |
| Pentalyn G | 47.18 |
| Aluminum stearate | 0.66 |
| Oleic acid | 2.83 |
| Paraffinic petroleum solvent—principally hendecanes and dodecanes, boiling range 365 to 400° F., Kauri butanol value 32 | 32.33 |
| | 100.00 |

*C.—Blue ink*

| | |
|---|---|
| Peacock blue | 22.40 |
| Pentalyn G | 39.71 |
| Aluminum stearate | 0.66 |
| Oleic acid | 2.86 |
| Solvent as above | 34.37 |
| | 100.00 |

*D.—Black ink*

| | |
|---|---|
| Carbon black | 13.98 |
| Furnace black | 3.68 |
| Clay | 19.50 |
| Iron blue | 3.03 |
| Alkali blue in | 0.56 |
| Bodied linseed oil | 0.77 |
| Pentalyn G | 26.45 |
| Soya licithin | 1.89 |
| Oleic acid | 2.83 |
| Solvent as above | 27.31 |
| | 100.00 |

These inks had the following rheological properties (determined on a Rotational viscometer at 30° C.):

| | Viscosity (Poises) | | Yield Value (dynes per sq. cm.) | |
|---|---|---|---|---|
| | 100 r.p.m. | 200 r.p.m. | 100 r.p.m. | 200 r.p.m. |
| Yellow | 132 | 101 | 1,410 | 1,920 |
| Red | 69 | 62 | 135 | 390 |
| Blue | 41 | 34 | 80 | 115 |
| Black | 32 | 23 | 390 | 540 |

EXAMPLE 2

*Single color black*

LIMED ROSIN TYPE

| | |
|---|---|
| Carbon black | 15.80 |
| Furnace black | 4.50 |
| Clay | 9.00 |
| Talc | 4.50 |
| Wood rosin | 29.65 |
| Hydrated lime | 1.91 |
| Gilsonite | 2.81 |
| Stearine pitch | 1.56 |
| Solvent of Example 1 | 30.27 |
| | 100.00 |

EXAMPLE 3

*Heavy-bodied single color black*

| | |
|---|---|
| Carbon black | 10.0 |
| Furnace black | 8.8 |
| Clay | 14.0 |
| Methyl violet | 0.1 |
| Oleic acid | 0.3 |
| 6% limed polypale (polymerized rosin) | 30.3 |
| Oilsonite | 3.3 |
| Solvent of Example 1 | 33.2 |
| | 100.0 |

Viscosity 161 poises at 77° F. and 30 r.p.m.

EXAMPLE 4

*Single color black*

| | |
|---|---|
| Carbon black | 12.8 |
| Furnace black | 8.4 |
| Clay | 9.0 |
| Methyl violet | 0.1 |
| Oleic acid | 0.3 |
| Pentalyn G | 34.0 |
| Gilsonite | 3.7 |
| Paraffin petroleum solvent—boiling range 305 to 325° F. | 31.7 |
| | 100.0 |

We can also use the inks described in our copending application Serial No. 421,242, or inks using other solvents which have the desired evaporation characteristics, e.g. ethylene and propylene glycol.

Special moisture setting inks are not required for practicing our invention, but are of course advantageous. We may use standard moisture setting inks which are not further stabilized against excess humidities, or special inks which are unstable above 50 to 55% relative humidity at 75° F., as disclosed in the copending Bernardi application Serial No. 549,203, filed November 25, 1955.

While the method has been described for use with heat drying inks and moisture setting inks only, it could obviously be applied to any printing method in which extreme sensitivity to ordinary ambient atmosphere prevents distribution of the ink.

We claim:

1. In a method for distributing ink in which an ink is passed from one roller to another to effect distribution and the ink is so unstable under ordinary ambient conditions that satisfactory distribution cannot be effected, the improvement which comprises feeding directly into the advancing nip between the rollers a gas in whose atmosphere the ink will not dry in the time required for distribution, at such a rate that a film of the gas a few thousandths of an inch in thickness is maintained on the rollers.

2. The method of printing on a press having an extended distribution system with an ink which is so unstable under ordinary ambient conditions that satisfactory distribution of the ink cannot be effected, which comprises feeding directly into a plurality of the advancing nips between the rollers of the distribution system, a gas in whose atmosphere the ink will not dry in the time required for distribution, at such a rate that a film of the gas a few thousandths of an inch in thickness is maintained on the rollers.

3. The method of printing on a press having an extended distribution system with a solvent containing ink which will dry on the distribution system under ordinary ambient conditions due to evaporation of the solvent which comprises preparing a gas containing ink-solvent vapor at a partial pressure in the range of the vapor pressure of the ink solvent on the distribution system of the press, distributing said gas as a thin film a few thousandths of an inch in thickness about the rollers of the distribution system, by feeding said gas directly into the advancing nips between the rollers of the distribution system at a rate sufficient to maintain such a film of gas about the rollers during the period in which an ink film is maintained on the rollers ready for printing.

4. The method of printing on a press having an extended distribution system during periods of high humidity with a moisture setting ink which is unstable on the press at high humidities due to absorption of moisture, which comprises drying air to a humidity low enough for the ink to be press-stable, distributing the dry air as a thin film a few thousandths of an inch in thickness about the rollers of the distribution system by feeding the dry air directly into the advancing nips between the rollers of the distribution system at a rate sufficient to maintain such a film of dry air about the rollers during the period in which an ink film is maintained on the rollers ready for printing.

References Cited in the file of this patent

UNITED STATES PATENTS

| | | |
|---|---|---|
| 643,372 | Cornwall | Feb. 13, 1900 |
| 1,749,316 | Catlin | Mar. 4, 1930 |
| 1,805,144 | Jones | May 12, 1931 |
| 1,837,702 | Canfield | Dec. 22, 1931 |
| 2,063,636 | Stevens et al. | Dec. 8, 1936 |
| 2,063,672 | Goddard | Dec. 8, 1936 |
| 2,272,406 | Gurwick | Feb. 10, 1942 |
| 2,319,853 | Durham | May 25, 1943 |
| 2,347,619 | Taylor | Apr. 22, 1944 |
| 2,546,793 | Sodomka | Mar. 27, 1951 |
| 2,707,916 | Smith et al. | May 10, 1955 |
| 2,821,133 | Brodie | Jan. 28, 1958 |

OTHER REFERENCES

Ellis: Printing Inks, 1940, Reinhold Pub. Corp., N.Y.; only pages 475 and 476 made of record.